(12) United States Patent
Madison et al.

(10) Patent No.: US 9,965,272 B2
(45) Date of Patent: May 8, 2018

(54) SYSTEM AND METHOD FOR MONITORING SOFTWARE DEVELOPMENT AND PROGRAM FLOW

(71) Applicant: HARTFORD FIRE INSURANCE COMPANY, Hartford, CT (US)

(72) Inventors: James A. Madison, Windsor, CT (US); Laif A. Wheeler, North Granby, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days. days.

(21) Appl. No.: 15/180,730

(22) Filed: Jun. 13, 2016

(65) Prior Publication Data
US 2016/0299757 A1 Oct. 13, 2016

Related U.S. Application Data

(63) Continuation of application No. 14/728,674, filed on Jun. 2, 2015, now Pat. No. 9,367,308, which is a continuation of application No. 13/588,694, filed on Aug. 17, 2012, now Pat. No. 9,134,999.

(51) Int. Cl.
  *G06F 9/44* (2006.01)
(52) U.S. Cl.
  CPC ............. *G06F 8/73* (2013.01); *G06F 8/20* (2013.01); *G06F 8/30* (2013.01); *G06F 8/71* (2013.01)
(58) Field of Classification Search
  CPC ..... G06F 8/20; G06F 8/30; G06F 8/71; G06F 8/73
  See application file for complete search history.

(56) References Cited

U.S. PATENT DOCUMENTS

| | | |
|---|---|---|
| 5,815,638 A | 9/1998 | Lenz et al. |
| 6,073,107 A | 6/2000 | Minkiewicz et al. |
| 7,062,449 B1 | 6/2006 | Clark |
| 7,069,229 B1 | 6/2006 | Richardson et al. |

(Continued)

OTHER PUBLICATIONS

Amfahr et al. "Exploring Agile: The Seapine Agile Expedition", 2011, Seapine Software, Inc. total pp. 161, retrieved from <http://downloads.seapine.com/pub/ebooks/SeapineAgileExpedition.pdf>.

(Continued)

*Primary Examiner* — Marina Lee
(74) *Attorney, Agent, or Firm* — Volpe and Koenig, P.C.

(57) ABSTRACT

A system and method for monitoring software development and project flow in the insurance industry using user stories is disclosed. The system and method include a communication interface that receives information included in communications; a processor and memory to: identify from the monitored communication a plurality of user stories; estimate a priority and assign a value to each story; store each story and associated priority and value as a product backlog; calibrate the difference in the assigned value of each story by comparing each story and the associated assigned value, and iteratively adjusting the assigned value based on the calibrated difference; and update the product backlog of user stories and associated calibrated assigned value; and a display device for displaying the status of the software development and project flow based on the stories remaining in the product backlog as compared to the completed user stories.

18 Claims, 10 Drawing Sheets

(56) References Cited

U.S. PATENT DOCUMENTS

| | | | |
|---|---|---|---|
| 8,055,606 B2 | 11/2011 | Kreamer et al. | |
| 8,332,251 B1 * | 12/2012 | Morris | G06Q 10/06 |
| | | | 705/7.22 |
| 8,566,779 B2 | 10/2013 | Sukhenko et al. | |
| 9,043,745 B1 | 5/2015 | Diskin et al. | |
| 9,087,155 B2 | 7/2015 | Boden et al. | |
| 9,182,945 B2 | 11/2015 | Boden et al. | |
| 9,501,751 B1 * | 11/2016 | Holler | G06Q 10/06 |
| 2004/0243968 A1 | 12/2004 | Hecksel | |
| 2005/0097505 A1 * | 5/2005 | Gupta | G06Q 10/06 |
| | | | 717/101 |
| 2005/0289503 A1 | 12/2005 | Clifford | |
| 2007/0168918 A1 | 7/2007 | Metherall | |
| 2007/0203856 A1 | 8/2007 | Frohnhoefer et al. | |
| 2010/0042968 A1 | 2/2010 | Bugayenko | |
| 2010/0115523 A1 * | 5/2010 | Kuschel | G06Q 10/06 |
| | | | 718/103 |
| 2010/0299650 A1 | 11/2010 | Abrahamsen et al. | |
| 2011/0191746 A1 | 8/2011 | Packbier et al. | |
| 2011/0289475 A1 * | 11/2011 | Sukhenko | G06Q 10/0631 |
| | | | 717/103 |
| 2012/0159441 A1 | 6/2012 | Ghaisas | |
| 2013/0219395 A1 * | 8/2013 | Geibel | G06F 9/5072 |
| | | | 718/101 |
| 2016/0299757 A1 * | 10/2016 | Madison | G06F 8/30 |

OTHER PUBLICATIONS

Mitch Lacey, "Estimating", Jan. 2012, total pp. 5, retrieved from <https://msdn.microsoft.com/en-us/library/hh765979.aspx>.

* cited by examiner

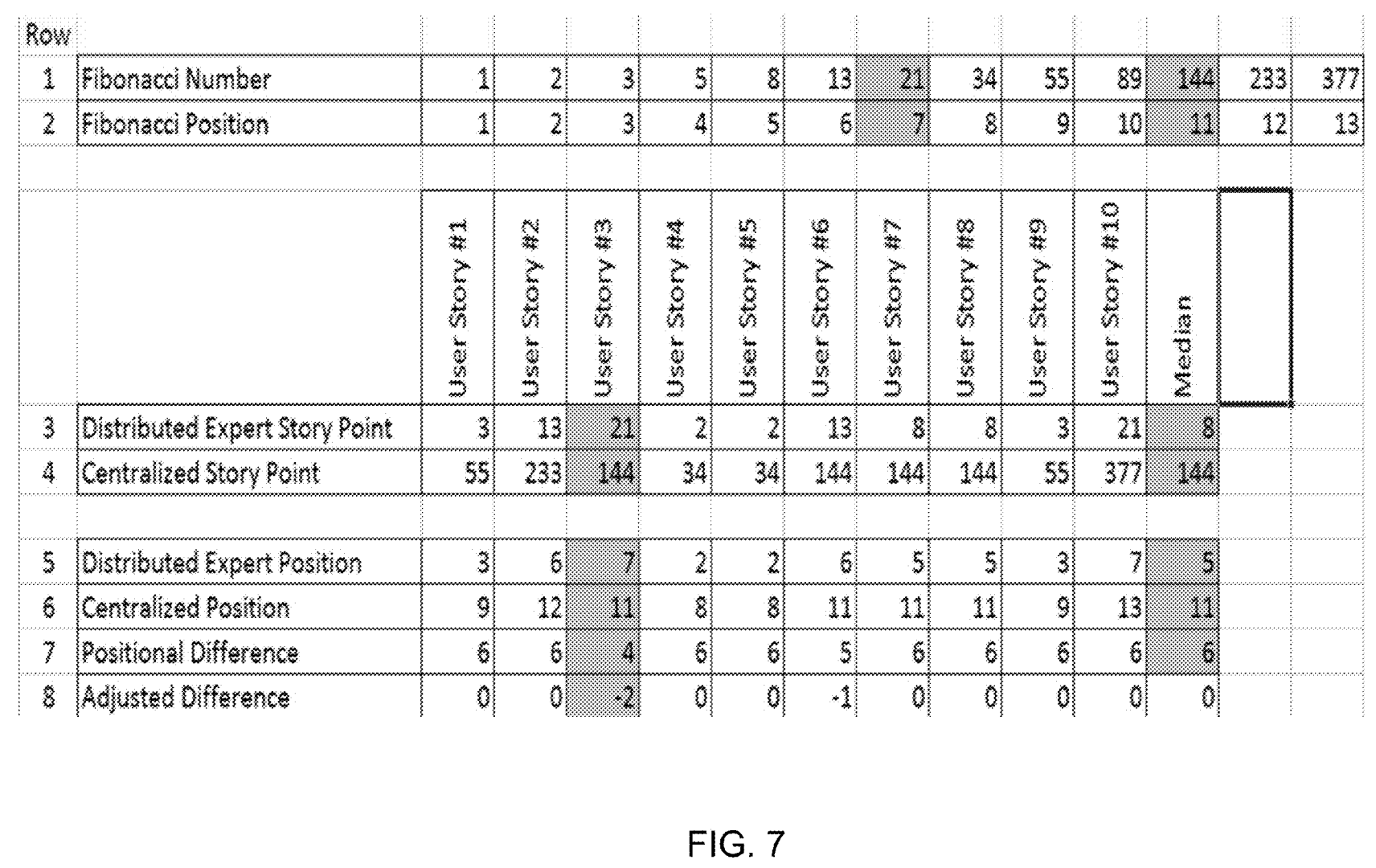

| Row | | US#1 | US#2 | US#3 | US#4 | US#5 | US#6 | US#7 | US#8 | US#9 | US#10 | Median | | |
|---|---|---|---|---|---|---|---|---|---|---|---|---|---|---|
| 1 | Fibonacci Number | 1 | 2 | 3 | 5 | 8 | 13 | 21 | 34 | 55 | 89 | 144 | 233 | 377 |
| 2 | Fibonacci Position | 1 | 2 | 3 | 4 | 5 | 6 | 7 | 8 | 9 | 10 | 11 | 12 | 13 |
| 3 | Distributed Expert Story Point | 3 | 13 | 21 | 2 | 2 | 13 | 8 | 8 | 3 | 21 | 8 | | |
| 4 | Centralized Story Point | 55 | 233 | 144 | 34 | 34 | 144 | 144 | 144 | 55 | 377 | 144 | | |
| 5 | Distributed Expert Position | 3 | 6 | 7 | 2 | 2 | 6 | 5 | 5 | 3 | 7 | 5 | | |
| 6 | Centralized Position | 9 | 12 | 11 | 8 | 8 | 11 | 11 | 11 | 9 | 13 | 11 | | |
| 7 | Positional Difference | 6 | 6 | 4 | 6 | 6 | 5 | 6 | 6 | 6 | 6 | 6 | | |
| 8 | Adjusted Difference | 0 | 0 | -2 | 0 | 0 | -1 | 0 | 0 | 0 | 0 | 0 | | |

FIG. 7

SYSTEM AND METHOD FOR MONITORING SOFTWARE DEVELOPMENT AND PROGRAM FLOW

CROSS REFERENCE TO RELATED APPLICATIONS

This application is a continuation of U.S. patent application Ser. No. 14/728,674, filed Jun. 2, 2015, which issued on Jun. 14, 2016 as U.S. Pat. No. 9,367,308, which is a continuation of U.S. patent application Ser. No. 13/588,694, filed Aug. 17, 2012, which issued on Sep. 15, 2015 as U.S. Pat. No. 9,134,999, which are incorporated by reference as if fully set forth.

BACKGROUND

Developing computer software and program flows is a complicated process. A myriad of different activities may be included. These include problem definition, requirements development, construction planning, high-level design, detailed design, coding and debugging, unit testing, integration, and system testing and maintenance, for example. The main activities of computer software and program flow construction include detailed design, coding, debugging, integration and testing including unit testing and integration testing. The quality of construction directly affects the quality of the software or program.

A variety of current technologies exist for monitoring the software development process; however, these technologies possess significant limitations. Thus, there is a need for robust technologies that may be used for, among other purposes, managing how the software development process is managed and how software developers communicate during the software development process.

SUMMARY

A system and method for monitoring software development and project flow in the insurance industry using user stories and calibrated estimation is disclosed. The system and method include a communication interface that receives, via one or more networks, information included in communications among distributed experts following a centralized process; a processor and memory that are integrated to: identify from a monitored communication a plurality of user stories for completion during software development; estimate a priority of each of the plurality of user stories; assign a value to each of the plurality of user stories, the assigned value represents an amount of effort needed to complete a user story; store each of the plurality of user stories and associated priority and value in the memory as a product backlog; calibrate a difference in the assigned value of each of the plurality of user stories by comparing a centralized position of each of the plurality of user stories and the associated assigned value, and iteratively adjusting the assigned value based on the calibrated difference; and update a product backlog of user stories with the user story's associated calibrated assigned value; and a display device for displaying the status of the software development and project flow based on a plurality of user stories remaining in the product backlog as compared to a plurality of user completed stories.

BRIEF DESCRIPTION OF THE DRAWINGS

A more detailed understanding may be had from the following description, given by way of example in conjunction with the accompanying drawings wherein:

FIG. 7 illustrates an output of the centralized calibration as identified in FIG. 5;

DETAILED DESCRIPTION

Figure 1:
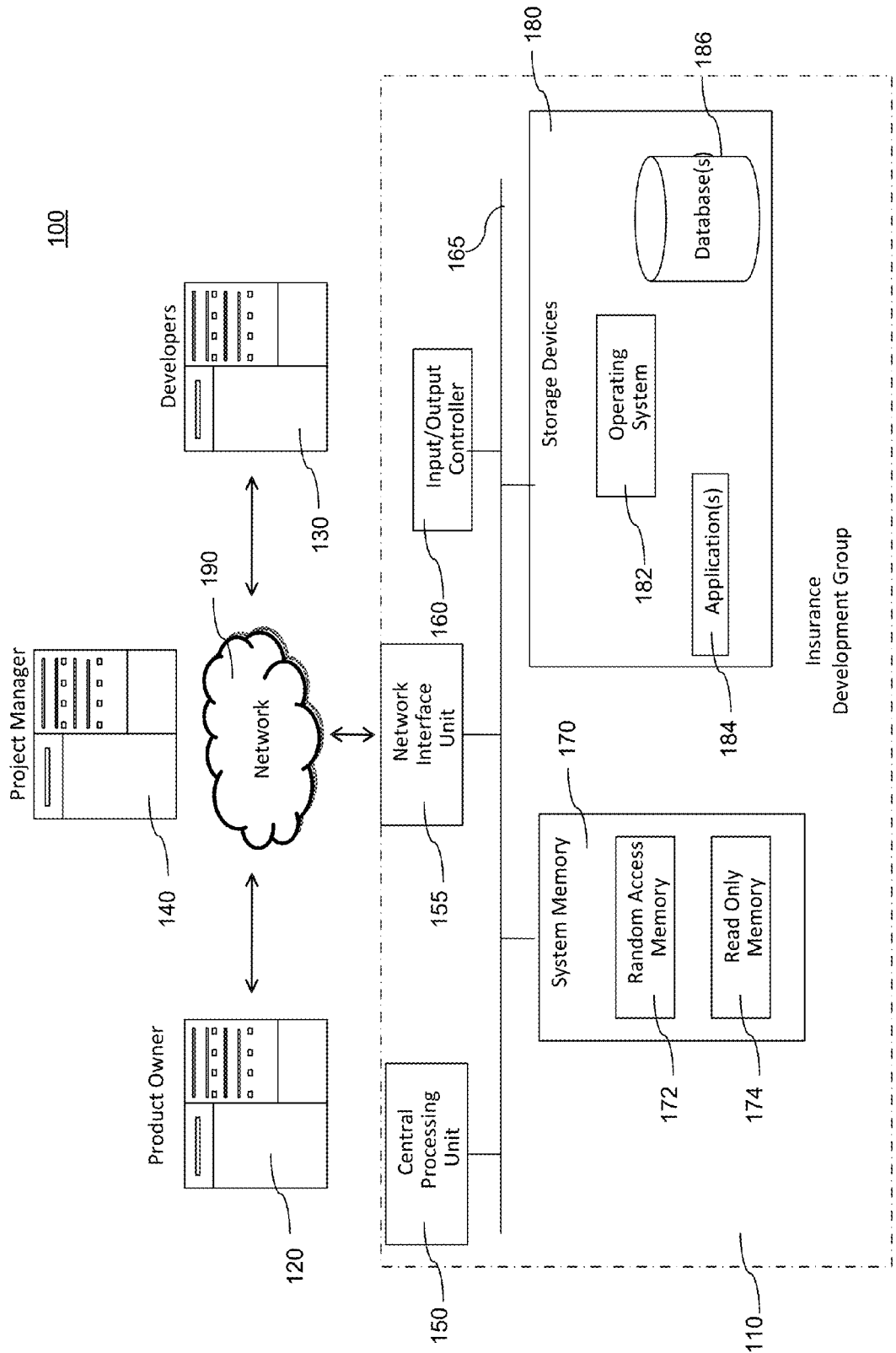
FIG. 1 illustrates a system diagram demonstrating the integration of distributed estimation with a centralized process.

Disclosed herein are processor-executable methods, computing systems, and related technologies and systems that may be used to provide monitoring for software development and program flow. Of particular application to the insurance industry, is the ability to develop software in an efficient manner, even though many insurance companies do not lend themselves to the flexible software development architecture. The software development and program flow may be classified according to projects that provide types of insurance, levels of insurance protection, and the states and locales where insurance protection may operate and be activated.

The systems and methods disclosed monitor software development and project flow in the insurance industry using user stories. The systems and methods include a communication interface that receives, via one or more networks, information included in communications among a distributed experts including at least one of a product owner, at least one developer, and a project manager, following a centralized process. The systems and methods include a processor and memory that act together to: identify from the monitored communication a plurality of user stories for completion during the development; estimate a priority of each of the plurality of user stories from the monitored communication; assign a value to each of the plurality of user stories, which value represents the amount of effort needed to complete the associated one of the plurality of user stories; and store each of the plurality of user stories and associated priority and value in the memory as a product backlog; calibrating the difference in the assigned value of each of the plurality of user stories by comparing the centralized position of each of the plurality of user stories and the associated assigned value and iteratively, adjusting the assigned value based on the calibrated difference; and updating the product backlog with the user story and associated calibrated assigned value. The systems and methods include a display device for displaying the status of the software development and project flow based on the plurality of user stories remaining in the product backlog as compared to the plurality of user stories completed from the product backlog.

The technologies described herein may be used with development teams that operate according to any number of different software development methodologies, combinations of different methodologies, and/or selective combinations of concepts from different methodologies. One example of software development and program flow methodology is the "waterfall" methodology. Waterfall represents the classical development model, in which progress of the software development gradually flows downward. Waterfall minimizes planning overhead since planning is performed once at the beginning; however, waterfall is generally inflexible, where backing up to address mistakes is difficult, and only the final phase produces a deliverable.

Another school of thought in the domain of software development methodology is "agile" development. This type of development is iterative and incremental—most agile methodologies are designed to facilitate adaptive planning and the ability to adapt to changing requirements. In many agile methodologies, the concept of a "user story" is used. A user story is an activity, event, or item that is part of the overall software process, representing software development work to be done, typically from the perspective of a user of the system.

FIG. 1 illustrates a system diagram demonstrating the integration of distributed estimation with a centralized process. This system has particular application to the insurance industry as insurance companies are often characterized as large, complex, historically constrained environments. System 100 may be used for monitoring software development using story points according to an embodiment. A story point is a value which represents the amount of effort needed to complete the associated user story. As shown in FIG. 1, a product owner 120 interacts with the insurance development group 110 using a network 190, such as the internet. Product owner 120 may be a customer, for example. Any data provided by or to the product owner 120 passes through the internet 190 to the insurance development group 110. Similarly, developers 130 may provide or receive information via the internet 190 to the insurance development group 110. The project manager 140, which includes the responsibilities of scrummaster under other methodologies, may pass data to the insurance development group 110 via the internet 190. Each product owner 120, developer 130, and project manager 140 may communicate with one another via internet 190. The insurance development group 110 may be configured to communicate with each product owner 120, developer 130, and project manager 140 via internet 190. The development system 100 includes a network interface 155 to enable the communication with one or more product owner 120, developer 130, or project manager 140.

System 100 includes one or more central processing units (CPU) 150, network interface units 155, input/output controllers 160, system memories 170, and storage devices 180. Each CPU 150, network interface unit 155, input/output controller 160, system memory 170, and storage device 180 is communicatively coupled via bus 165.

System memory 170 includes random access memory (RAM) 172, read only memory (ROM) 174, and one or more caches. Storage devices 180 may include one or more applications 184, an operating system 182, and one or more databases 186. Storage devices 180 may take the form of, but are not limited to, a diskette, hard drive, CD-ROM, thumb drive, hard file, or a Redundant Array of Independent Disks (RAID). System 100 is accessed via network 190 using a mainframe, thin client, personal computer, mobile device, pad computer, or the like. Information processed by CPU 150 and/or operated upon or stored on storage devices 180 and/or in memory 170 may be displayed to a user through a user device (not shown).

The software development and program flow may include particular roles, or classes of people, comprising developers 130. For example, certain people may be dedicated to producing the product, or the objective of the project. Product owner 120 represents the customers, which may be the insurance company or the customer of the insurance company, for example, and is accountable for ensuring that the developers 130 deliver value to the business. Product owner 120 writes customer-centric items (typically user stories), prioritizes them, and adds them to the product backlog. During software development there may be one product owner 120, and while product owner 120 may also be a developer 130, it may be beneficial that product owner 120 not be combined with the project manager 140.

The developers 130 are responsible for delivering potentially shippable product increments at the end of each development stage, referred to as a sprint. Developers 130 may be made up of 3-9 people with cross-functional skills who do the actual work including analyze, design, develop, test, technical communication, document, and the like. Developers 130 are self-organizing, even though developers 130 may interface with project management organizations.

A meeting of the parties involved, sometimes referred to as a scrum, is facilitated by a project manager 140, who is accountable for removing impediments to the ability of the team to deliver the sprint goal/deliverables. Project manager 140 is not in charge of the software development, but may act as a buffer between the developers 130 and any distracting influences. Project manager 140 ensures that the process flows as intended. Project manager 140 is the enforcer of rules. A key part of project manager's 140 role is to protect developers 130 and keep them focused on the tasks at hand. The role has also been referred to as a servant-leader to reinforce these dual perspectives.

Stakeholders (e.g., customers or vendors) (not shown) are the people that enable the project and for whom the project produces the agreed-upon benefits that justify its production. Stakeholders are only directly involved in the process during the sprint reviews, discussed herein. Managers (not shown) are people that control the environment.

Operationally, system 100 monitors and records interactions between and among insurance development group 110, product owner 120, developers 130, and project manager 140. The specific interactions may be described herein with respect to FIGS. 2-8.

Figure 2:
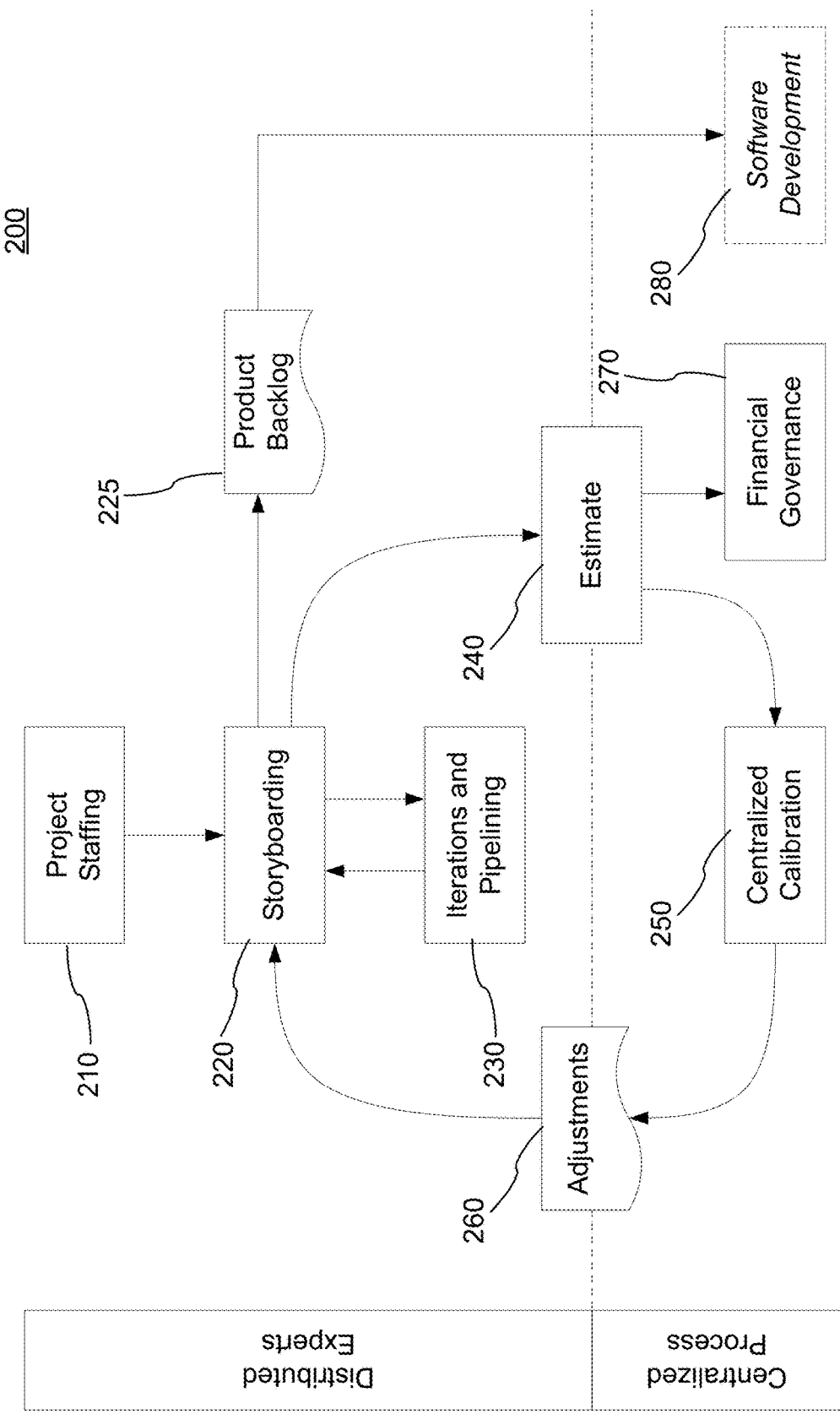
FIG. 2 illustrates a flow demonstrating the integration distributed estimation with a centralized process.

FIG. 2 illustrates a flow 200 demonstrating the integration of distributed estimation with a centralized process. This process may adapt the agile and waterfall approaches for use together. Specifically, FIG. 2 illustrates project staffing 210 that is provided as an input to storyboarding 220. Iterations and pipelines 230 may be coupled to storyboarding 220. Storyboarding 220 outputs to estimate 240. After one or more iterations of storyboarding 220, estimation 240, centralized calibration 250, and adjusting 260, storyboarding outputs to product backlog 225. Product backlog outputs to software development 280. Estimate 240 outputs to financial governance 270 and centralized calibration 250. Centralized calibration 250 outputs to adjustments 260. Adjustments 260 input back to storyboarding 220.

The above processes are performed by distributed experts and/or a centralized process. Distributed experts perform project staffing 210, storyboarding 220, iterations and pipelining 230, product backlog 225, and at least a portion of each of adjustments 260 and estimate 240. The other portions of adjustments 260 and estimate 240, and centralized calibration 250, financial governance 270 and software development 280 are part of the centralized process.

Project staffing 210 includes creating developers 130, project manager 140 and product owner 120, and assigning functions and tasks to each created role within the software development.

Project staffing 210 includes creation of a team of developers 130. The team is established for the specific tasks to be performed, such as to perform estimation 240. The team may be limited in size, such a being 3-9 members, for example. Multiple independent or interactive teams may act simultaneously, such as the approach known in other methodologies as scrum-of-scrums, for example. Team members are selected for their respective expertise in software development across the centralized process roles, including project management, business analysis, software development, quality assurance, or production operations, for example. Even though the team is formed based on the tasks of the centralized process, the team may be charged with disregarding the central process roles when performing storyboarding 220, iterations and pipelining 230, estimation 240, and adjustments 260. In estimation 240, the team members may consider any aspects of what is needed to deliver the specified work product.

A product owner 120 may also be selected in project staffing 210. The product owner 120 is trained on the product owner 120 sub-process. That is, the product owner 120 may be trained on the specifics of the software development and may interact with the insurance development group 110 to understand and aid in developing the software for the insurance customer. The product owner 120 may be responsible for interacting with insurance group 110 on a continual basis for the duration of the project.

Additionally, project manager 140 may be selected in project staffing 210. Project manager 140 may be accountable for removing impediments to the operations performed by developers 130 and may act as a buffer between the team and any distracting influences. Project manager 140 may be the enforcer of rules. That is, project manager 140 protects the developers 130 and keeps them focused on the tasks at hand.

While the scrum process in the software industry generally recognizes the power and responsibility of the product owner 120, flow 200 modifies this standard in order to operate and account for the large, complex, historically-constrained environment of the insurance company and industry. Such modifications include accountabilities to larger stakeholder communities, greater financial rigor, integrating the competing business priorities of multiple constituencies, and constraining the current product development work based on the limitations of other systems caused by the complexity of insurance logic and the nature of change-sensitive infrastructure resulting from the diversity of systems evolved from heterogeneous insurance products. During the project, the product owner 120 may continually execute activities and manage decision making responsibilities. These decision making responsibilities may include setting backlog priorities for the developers 130. Backlog priorities may be set quickly and unambiguously. The product owner 120 may make decisions for the developers 130 based on priorities of the business and organization, and may be willing to accept lower-quality design in exchange for more business functionality. Similarly, based on an understanding of the tasks of the developers 130, the product owner 120 may be responsible for working within the insurance company to bring together individuals and resources with knowledge of the business problem being solved by the software being developed. The product owner 120 may align the priorities of the work being done by the developers 130 to the priorities stated in the organizational cost benefit analysis (CBA) and project charter for the project and the priorities set through the centralized process.

The function of the product owner 120 may be assigned in project staffing 210. For example, product owner 120 may maintain communication and coordination responsibilities with developers 130 and insurance group 110. The product owner 120 directs the development to follow a centralized process. This centralized process enables the realities discovered by the distributed experts that make initial assumptions infeasible to be overcome by modification of the assumptions. Product owner 120 and/or project manager 140 may handle the changes in control process.

Product owner 120 collaborates with the larger community to understand all priority drivers and communicate decisions to the larger community in the centralized process, while balancing the competing forces to determine the final prioritization of product backlog 225. The product owner 120 may be responsible for adjusting the priorities of the product backlog 225 and iterations and pipelining 230 based on the input of the developers 130 based on their understanding of technology constraints. The product owner 120 may work with business leaders to understand the objectives of the larger organization and ensure proper prioritization of the product backlog 225 accordingly. The product owner 120 may manage expectations throughout the community of the centralized process when priorities shift.

Storyboarding 220 includes the decomposition of the software development and program flow from the larger user story to smaller user stories for placement in the product backlog 225. The project manager 140 collaborates with product owner 120 and developers 130 in a series of storyboarding sessions. In these storyboarding sessions, they incorporate the user stories into the storyboard. The product owner 120 controls the content of user stories, which reflect the work to be done by the developers 130 during the project. But it is the developers 130 who conduct the estimate 240 of the work to perform a user story. Such an estimation may be quantized by assigning a value from a numeric sequence, such as a Fibonacci sequence, to each task based on the amount of work needed to complete the task.

The product owner 120 and developers 130 may execute the iterations and pipelining 230. Iterations and pipelining 230 is generally performed in parallel with generating the content in storyboarding 220 and creating the product backlog 225 and/or may be performed after the product backlog 225 is substantially completed.

Iterations and pipelining 230 may include the product owner 120 and developers 130 breaking down these tasks into two levels. One level may be a decomposed to iterations. In this decomposition, the work may be subdivided into smaller and smaller parts until no unit of work is more than two weeks of time, and the average unit of work is about two days of time. The second level may include decomposition to a pipeline. In this decomposition, the units of work may be decomposed according to the type of work, such that the sequencing of the work is offset across time, such as limiting a pipeline step to no more than two days of total person time, for example. The level of decomposition performed in this sub-process is integrated back into storyboarding 220 to allow the user stories to be in smaller units that match those produced by iterations and pipelining 230.

The storyboard from storyboarding 220 may be generated from two perspectives. First, the storyboard may be created by the developers 130 and product owner 120 in a work-centric order, and then may be transformed into a priority-centric order. The work-oriented storyboard may be created by the product owner 120 and developers 130 by breaking the work down into roughly 10 to 20 user stories that are represented horizontally across a work space. These user stories may be the top-level user stories. Each top-level user story may be decomposed into a vertical set of user stories that compose the top-level user story. The decomposition may proceed until the product owner 120 and developers 130 determine the user stories are sufficiently decomposed. Once all of the top-level user stories are decomposed into vertical columns, each may be given a priority based on the Fibonacci sequence, for example. Once all the decomposed user stories have been assigned Fibonacci numbers, the decomposed user stories may be transferred to the time-oriented storyboard.

Second, a time-oriented storyboard may be created. The time-oriented storyboard may be based on user stories that are to be executed in priority order. The top-level decomposition may be a set of time-series events known as sprints. This time-oriented storyboard may be created by moving the more critical user stories in the work-centric storyboard to early sprints, and the less critical user stories to later sprints. In this way, the parts of the user story are examined, instead of a focus on the big user story as is the case with the work-centric storyboard. For example, while a big user story may be important as a whole, its parts may not be. Those less important parts may be spread out to later sprints when organized in product backlog 225. This priority order may be repeated as smaller stores are made even smaller, for example. The decomposed work-oriented user stories may be transferred to the time-oriented storyboard, but instead of their original order, the work-oriented user stories may be ordered according to the priority established by the product owner 120.

Estimation 240 may include assigning scaled estimates to each user story associated with the software development. This may include assigning a number to the user story that is associated with the time and difficulty in completing the user story. Estimation 240 may be a local variable. That is, estimation 240 may be only within a given project or user story, for example. Or estimation 240 may be a global variable in that the task in a user story in one project is assigned a certain number or weight because the tasks corresponds in difficulty and time to another user story in another project assigned the same number or weight.

Centralized calibration 250 may be the process of ensuring that software development project estimation is being done consistently throughout an organization. Centralized calibration is centralized in that the standards and practices followed are published and mandated by a central authority in the organization. Calibration is the process of adjusting information, interpretations, understanding, and opinions of those involved until there is a reasonable confidence that all parties are using the same criteria for judgment. The actual metrics being calculated are the time and dollar estimates provided by the software development teams. The expertise of the software development teams may be augmented by staff from the centralized calibration practice whose role is specifically to help everyone estimate consistently.

The top-most user story and the top-level user stories may be provided as input to the centralized calibration 250 from estimate 240. The top-most user story may describe the entire project. The top-level user stories are the 10 to 20 user stories that, when completed, may fulfill the top-most user story and evidence delivery of the project.

The distributed experts may be responsible for forcing the top-level user story count into the 10 to 20 range by merging or splitting other user stories in a manner meaningful to the project. According to estimation 240, the top-level user stories may have Fibonacci story points as viewed from the distributed experts' point of view.

The output of the centralized calibration 250 may include top-level user stories returned to the distributed experts and the developers 130 with the original story points as well as the addition of centralized story points. The centralized calibration 250 may include a brief rationale for any story point discrepancies, as there may be some variation between the distributed expert story points and the centralized story points. Such discrepancy may be discerned in the relative Fibonacci positions.

As shown in FIG. 2, adjustments 260 provided through the loop to storyboarding 220 through an operations loop 290. The flow of operations loop 290 may be repeated with the estimation 240 operating with adjustments 260. Estimation 240, including adjustments 260, may operate with the top-level user stories with the centralized story points run through estimation 240 by the distributed experts. Discrepancies are in the operations loops are expected and are the reason why the process is iterative.

Any discrepancies in estimation 240 may be addressed by the distributed experts by accepting the findings of the calibration process 250 and adjusting the story points to the centralized story points, and/or reviewing the rationale of the centralized process experts and exchanging information to enable the distributed experts and the centralized process experts to reach an agreement on a new estimate.

The adjustment 260 may be fed back into the centralized calibration process 250 until the total adjusted difference is zero, or meets a threshold that is agreed upon by all developers 130, such as an absolute value maximum of one for the adjusted difference per user story, for example. The distributed experts may utilize their calibration skill to propagate the same magnitude to all user stories below the top-level user stories using the same process described herein, but repeating to whatever depth of calibration is deemed necessary by the distributed experts or the centralized process.

Financial governance 270 may include the modeling and meeting of financial benchmarks associated with the project. In order to provide financial governance, the estimates may be feed into the centralized process.

Software development 280 may be fed from the product backlog 225 and may be completed when the product backlog is sent through the normal centralized process software development lifecycle (SDLC).

Figure 3:
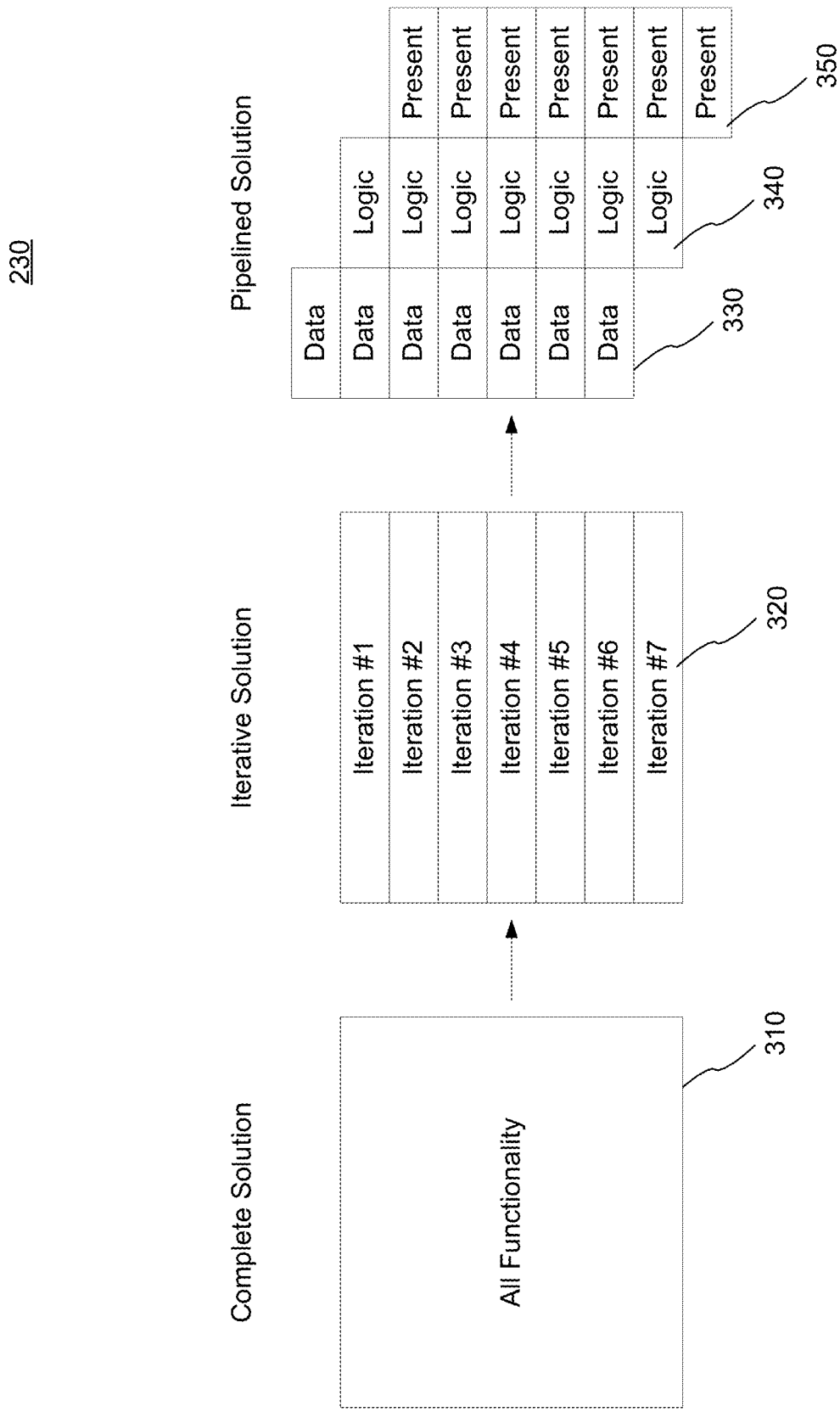
FIG. 3 illustrates an example of iterations and pipelines.

FIG. 3 illustrates an example of iterations and pipelines 230 described hereinabove. Specifically, FIG. 3 illustrates a complete solution that is broken down into a set of iterative solutions and then into a set of pipeline solutions. In this illustration, iterations and pipelines 230 analyzes the complete solution and all of the functionality 310. This functionality 310 may then be decomposed into, for example, seven iterations 320.1, 320.2, . . . , 320.7 (collectively 320), which is shown as the iteration solution. Each iteration 320 is then decomposed into a pipeline solution that includes data 330, logic 340, and present 350. For example, iteration 320.1 may be decomposed into data 330.1, logic 340.1, and present 350.1. In this way the functionality 310 is decomposed into an iterative solution 320 and a pipelined solution 330, 340, 350. This decomposition breaks the problem down and the solution from a technical perspective so that smaller user stories may be used, for example. The combination of the techniques discussed herein provides a decomposition that breaks a problem down into sprintable units, and uses a pipeline for processing these sprintable units to provide a sequence for optimizing throughput.

By way of non-limiting example, assume a business area has the need to help a customer get an insurance quote. This is a large amount of system functionality 310 in FIG. 3. Such functionality 310 is too large to execute as a unit, so the team must decompose this into smaller units of work. Each smaller unit of work is represented by one of the seven horizontal bars in iterations 320. Such smaller units constitute user stories and may be for example, "submit personal information," "submit vehicle information," "get prior carrier information," "clarify missing information," and the like. These smaller units of work are now capable of being executed in an iterative fashion and delivered to the business areas for review on a shorter time basis, typically one to three weeks. However, the user stories in 320 may still be too large from a technical perspective to be turned into software as a unit, so the team must further decompose the user stories into their natural technical boundaries, one example of which is data 330, logic 340, and present 350. In this example, the software work falls naturally across the database 330, the logic 340, and the presentation 350, so the technical team takes each user story in iterations 320, and breaks it into three component parts of data 330, logic 340, and present 350. Then to handle the sequential dependency, the several items of work are offset across the iterations 320. For example, iteration #1 may only perform the data work for "submit personal information." Iteration #2 may perform the data work for "submit vehicle information," the application logic for "submit vehicle information," and so on, such that there are iterations across data 330, logic 340, and present 350, but enabling a staggering of the work.

Figure 4:
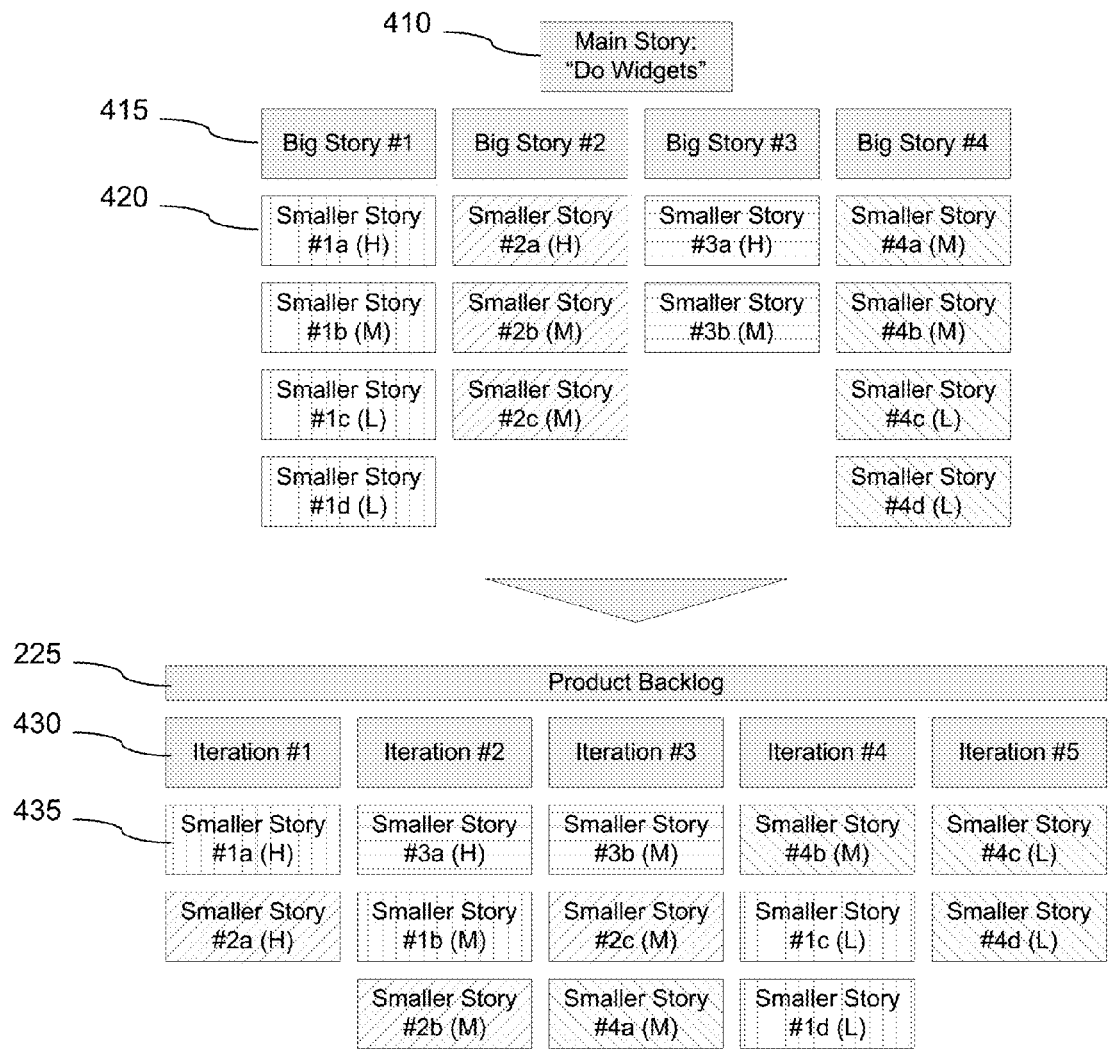
FIG. 4 illustrates the decomposition of the software development and program flow from the larger user story to smaller user stories for placement in a product backlog that may occur during storyboarding.

FIG. 4 illustrates the decomposition of the software development and program flow from the larger user story to smaller user stories for placement in product backlog 225 that may occur during storyboarding 220. User stories are generally tasks that need to be performed in order to achieve a larger goal. User stories may be referred to as items and/or tasks as well. As may be seen in the uppermost portion of FIG. 4, the main story 410 is decomposed into several big user stories 415, for example four. Each of these big user stories 415 is then decomposed further into smaller user stories 420. Each of the smaller user stories 420 are associated with the big story 415 from which it is derived. This association is evidenced by the vertical alignment under the big story 415 from which the smaller story 420 derives. Each of the smaller user stories 420 is assigned an identifier that identities the big story 415 and provides the order of the smaller user stories 420 that derive from that big story 415. Additionally, each smaller story 420 is assigned a designation of the priority. In this case, the priority is designated as H—high, M—medium, and L—low. For example, a smaller story 420 is identified as #1a (H). This means that the smaller story 420 derives from big story #1, with the "a" representing that it is the first smaller user story to derive from big story #1, and that this smaller story 420 has an "H" priority.

As shown in FIG. 4, the big user story may decompose into any number of smaller user stories. The depiction of FIG. 4 illustrates big user stories 415 decomposing into 2, 3, or 4 smaller user stories 420, although any number of smaller user stories 420 may be used. The decomposition of user stories occurs under the larger user story to enable the discussion and thinking to focus on one user story at a time. While breaking the main story 410 down by thinking of one user story at a time, to execute the user stories 420 it is necessary to order the user stories 420 based on priority. This enables the process to operate by moving more critical items, higher priority user stories, earlier in the process, and the less critical items, lower priority user stories, later in the process.

This decomposition of the main story 410 into big user stories 415 and then smaller user stories 420 may be transformed into a product backlog 225 as shown in the bottom portion of FIG. 4. This transformation to product backlog 225 may include several iterations 430. Product backlog 225 is shown having five iterations 430, for example. Each iteration 430 may include any number of smaller user stories 420 that are grouped based on priority to achieve the completion of highest priority user stories first. Each iteration may be defined to take a certain amount of time to complete, such as two days or a week, for example. The user stories may be grouped by priority using the time constraint of the iteration when organizing the iterations. The priority organization 435 of the smaller stories is shown in FIG. 4. That is, during iteration #1, smaller story #1a and smaller story #2a may both be performed as each has a high priority and can be completed in the requisite iteration time. Iteration #2 includes smaller story #3a, which completes the high priority user stories, and middle priority user stories #1b and #2b. Story #3b relates to iteration #2 and also has a medium priority but cannot fit into iteration #2 because iteration #2 would exceed the time constraint. Therefore, smaller story #3b is pushed down to iteration #3, as illustrated in FIG. 4.

Using this approach, it is possible that important user stories that are main user stories 410 or big user stories 415 may have decomposed with smaller user stories 420 that have lower priority even if the big user stories 415 and/or main user stories 410 have high priorities. The less important portions of the decomposed user stories may be spread out until later in the process when organized in the product backlog 225. This concept may repeat itself as decomposition is performed at smaller and smaller levels of user stories.

The decomposition of stories may facilitate communication between product owner 120, developers 130, project manager 140, and insurance development group 110. Priority of user stories may be assigned a number from a numerical sequence, such as one of the Fibonacci numbers as discussed above, based on agreement of participating parties. If full agreement cannot be reached, a consensus of participating parties may be used. The user stories and priorities are estimated based on known information. The goal of the assigned numbers is to get a relative magnitude of the effort required to complete the user story and not necessarily an exact time for completion. One user story may be chosen as a baseline and other user stories may be estimated relative to the baseline user story.

Developers 130 may spend time maintaining and updating product backlog 225. This may include estimating the existing backlog using the numbers of the numerical sequence, refining the numbers assigned to individual user stories, and continuing to break larger user stories into smaller user stories.

Figure 5:
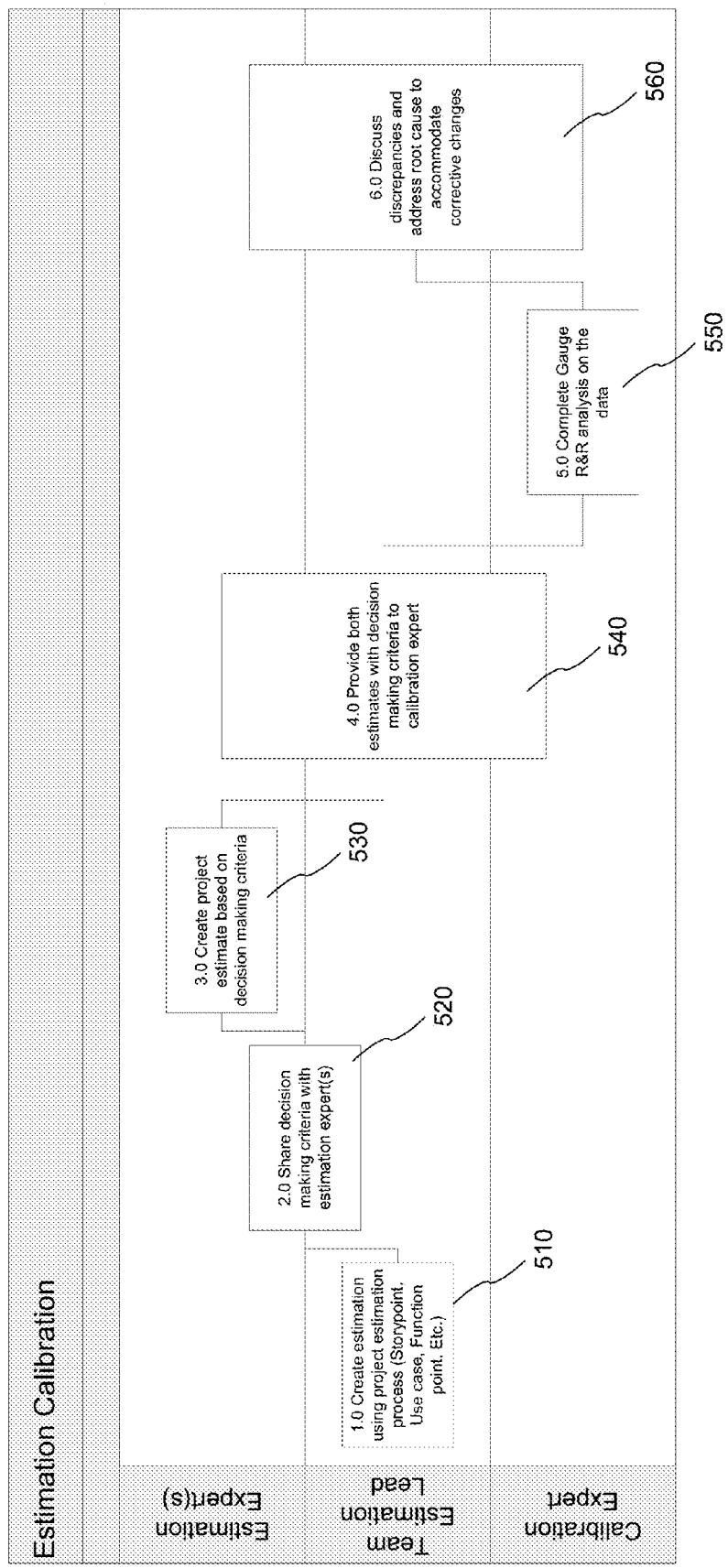
FIG. 5 illustrates a flow diagram of centralized calibration.

FIG. 5 illustrates a flow diagram of the centralized calibration 250. The estimation calibration 500 may include six steps including creating an estimation using project estimation 510, share criteria 520, create project estimate 530, share estimates 540, complete gauge R&R calibration 550, and review discrepancies 560. Creating an estimation using project estimation 510 may include creating estimation using project estimation, such as by using user stories, and assigned numbers, for example. Sharing criteria 520 may include sharing decision making criteria with estimation experts. Creating project estimates 530 may include creating a project estimate based on a decision making criteria. Sharing estimates 540 may include providing both estimates with decision making criteria to calibration expert. Complete gauge R&R calibration 550 may include any measurement system analysis designed experiment that seeks to identify the components of variation in the measurement. Review discrepancies 560 may include acknowledging discrepancies and addressing root causes of the discrepancies to accommodate corrective changes.

The experts that may be involved in the estimation calibration include centralized experts and distributed experts. Centralized experts may include a group of people with expertise in project development and estimation that are part of the centralized process. Centralized experts may estimate all the projects that move through the centralized calibration process. Distributed experts are those that have their project move through the centralized calibration process. Centralized experts may provide a global view, while distributed experts may provide a view localized for a given project, for example.

The calibration shown in FIG. 5 is the calibration of the top-level user stories. The process may begin by creating an estimation 510 which may include assigning centralized story points to every top-level user story as discussed with respect to storyboarding 220 and estimation 240, for example. The centralized process may be calibrated across many projects being calibrated and may assign other values, or modify the values assigned to user stories. The centralized user stories may be an estimate of the cost of each top-level user story relative to every other top-level user story going through the centralized calibration, or that has gone through the centralized calibration and is part of the reference library. The top-level user story reference library is a collection of top-level user stories that have gone through the centralized calibration previously and may be used for the purpose of training and validating both the distributed experts' and centralized experts' ability to assign values to user stories accurately. The library may be empty on day one, or may be primed with a few historical cases. The library may be grown by taking useful top-level user stories from projects moving through the process.

Figure 6:
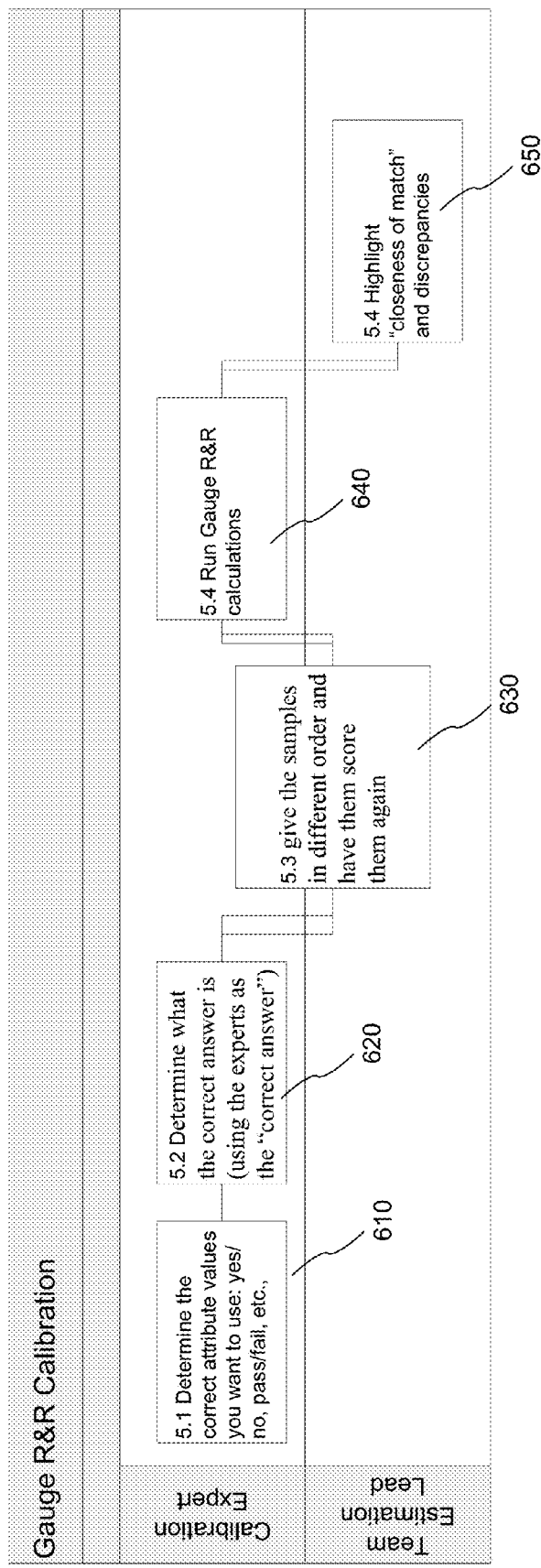
FIG. 6 illustrates the gauge R&R calibration of FIG. 5.

FIG. 6 illustrates the gauge R&R calibration of FIG. 5. As illustrated in FIG. 6, gauge R&R calibration 550 may include determining the correct attribute values that are to be used at step 610. This determination may be made by a calibration expert and may be evidenced as yes/no, pass/fail, for example. The calibration 550 may include determining the proper answer at step 620. That is, the calibration expert may determine what the correct answer is. At step 630, calibration 550 may assign the samples in a different order and have the samples scored again. At step 640, calibration 550 may include running gauge R&R calculations. The present description includes a description focusing on R&R. Any known process may be used and R&R is provided by example only. R&R stands for repeatability and reproducibility and stems from Lean or SIX Sigma domain. R&R allows the same person to repeat an estimate given a similar sample and another estimator may reproduce the same result as the experts, thereby providing repeatability and reproducibility. At step 650, calibration 550 may include highlighting the preciseness of the match and discrepancies of the attribute values on which the calibration is performed.

FIG. 7 illustrates an output of the centralized calibration 250 and the further description associated with FIG. 5. As shown in FIG. 7, Row 1 identifies the Fibonacci numbers, Row 2 identifies the ordered position of the Fibonacci numbers, Row 3 identifies the story points from the distributed experts, Row 4 identifies the story points from the centralized process, Rows 5 and 6 identify the Fibonacci positions of the two areas, Row 7 identifies the difference between the two story points, and Row 8 identifies the difference minus the median positional difference. That is, Row 8 is the number that shows the actual difference between the estimates. The expectation is the actual values from the Fibonacci sequence used by the two groups may be very different, thus the need to emphasize the adjusted difference based on their relative positions.

As an example, in calibrating the insurance quote project example discussed previously, assume the user story "get prior carrier information" is shown as User Story #3 in FIG. 7. For that user story, the distributed experts assigned it an estimate of 21 story points. This is shown on row 3. The centralized group assigned it 144 story points. This is shown on row 4. In order to calibrate assigned values, the median story points for most groups should be known. The Fibonacci numbers themselves cannot be directly calibrated, and instead calibrate may be based on Fibonacci position. By determining the median, the estimates may be normalized. This is illustrated in rows 5 through 8. In row 5, the value of 7 is used because that is the Fibonacci position of the Fibonacci number 21. In row 6, the value of 11 is used because that is the Fibonacci position of the Fibonacci number 144. A conversion on the column labeled Median may be performed, converting the values 8 and 144 to 5 and 11 respectively. The positional difference between the teams is now needed to determine the overall agreement. This positional difference may be performed in row 7 which is the centralized position minus the distributed expert position. For each cell on row 7, subtract the value in the Median column on row 7 and enter this value in row 8. Any non-zero value on Row 8 must be brought into alignment by the two teams calibrating their estimates. The calibration may include discussions, the exchange of information, use of formal authority or whatever else is needed. The mechanics of such work are too highly variable to be dictated, so they are only judged by outcome. The outcome is that Row 8 is all zeros, or if the teams decide, some threshold of tolerance, such as between −1 and 1, for example. The calibration concludes when Row 8 reaches such a value or within a tolerance of such a value.

Figure 8:
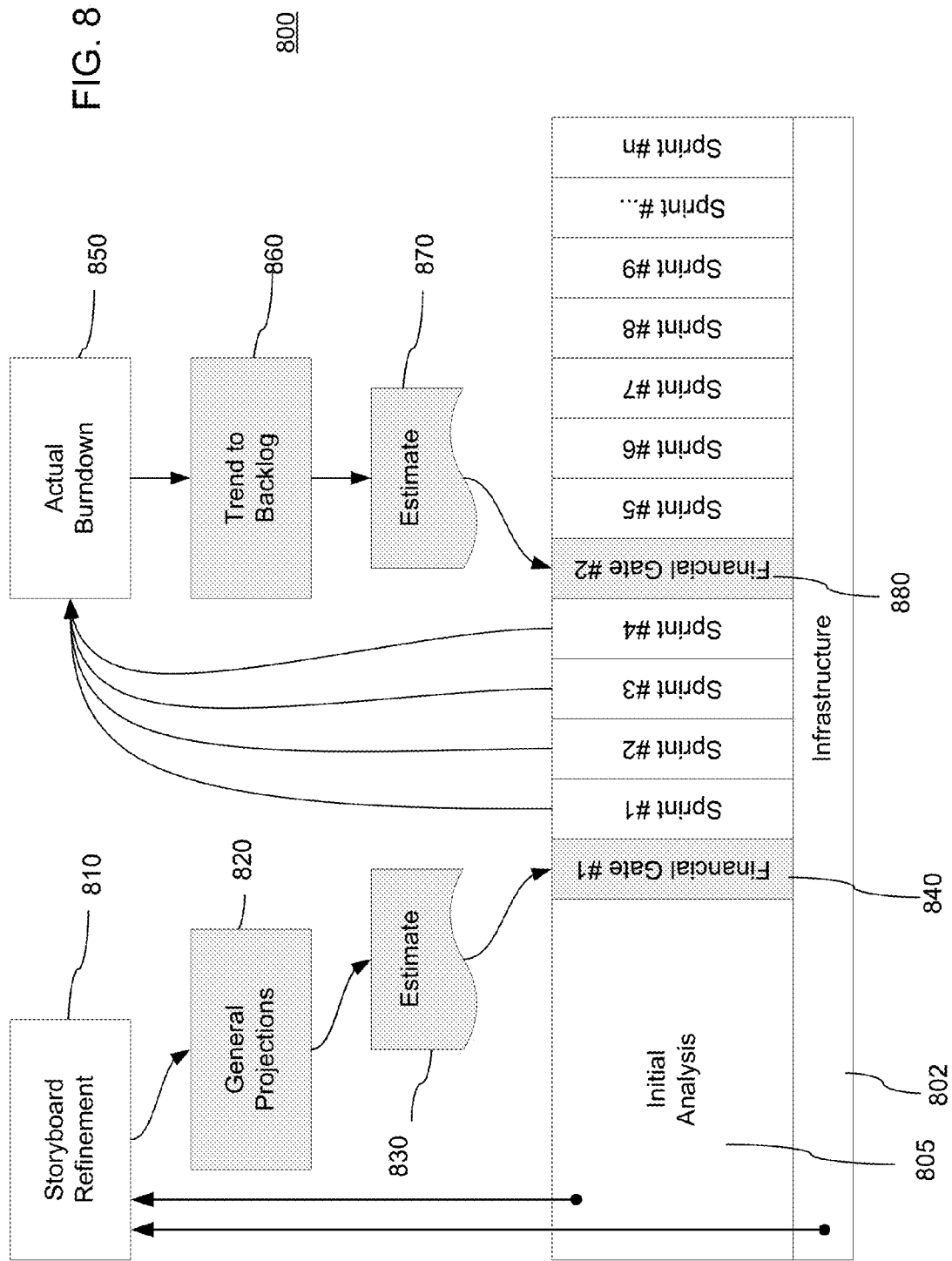
FIG. 8 illustrates a process of financial governance associated with the distributed estimation with a centralized process, using two approaches that are adapted together.

FIG. 8 illustrates a process 800 of financial governance 270 associated with the distributed estimation with a centralized process. Process 800 includes initial analysis 805 that include user stories that can be well predicted and infrastructure 802 that includes user stories that have lead time. For example, infrastructure 802 may include requests for servers. Initial analysis 805 and infrastructure 802 provide input for the storyboard refinement 810. This storyboard refinement 810 may occur as discussed herein, including breaking down the user story into sprintable items and assigning the broken down user story a priority and an assigned value associated with effort required to complete the user story. The user story refinement 810 provides input to the general projections 820 that includes standard project estimation and parameters. The projections 820 provide input to an estimate 830. This estimate 830 activates a first financial gate 840. First gate 840 may be based on completion of infrastructure 802 and completion of the general projections 805. First gate 840 may create an initial SAD with ranges and not points. After passing the first gate 840, a series of sprints 220 (shown as four sprints but any number may be performed) may be performed to complete smaller user stories. The output of each of the sprints may be provided to an actual burndown 850.

Burndown 850 may include tracking the amount of work remaining across time. Burndown 850 may clarify project trending and provide rapid feedback related to adjustments 260. Burndown 850 may enable variation in the product backlog 225, such as by removing functionality, to stay or get back on track, for example.

Burndown 850, in turn, feeds the trend to backlog 860 that provides a concrete estimate by establishing a trend and extending the trend to backlog 860. An estimate 870 may be achieved from the burndown 850 and trend to backlog 860 information. This estimate may be the input into a second financial gate 880. Since some work has been completed in the earlier sprints, a verification of assumptions of the project may be made empirically, and an adjustment of the priority and estimates may be done. The project manager may lead through the first gate 840 and participate though the second gate 880. After refactoring at the second gate 880, additional sprints may be performed until completion of the project. As shown sprints 5-12 . . . n may be performed.

The project developers 130 may be aware of when the centralized process requires the estimate to go through a financial gate. Infrastructure may be estimated independently using the standard centralized process. The project developers 130 perform the normal work of storyboarding 220 as outlined above. The developers 130 and project manager 140 work to map the Fibonacci relative numbers to physical time of days, weeks, months, and years—whichever units of time make the most sense. This may be performed by considering the mix of skills of developers 130. The time estimates are provided to financial governance. The developers 130 perform an incremental software development effort for several sprints as a means of testing the rate at which the software is built. The actual rate of build is tested against the initial estimates. Any difference is trended to the backlog 225. That is, a ratio is determined for the work attempted that shows what was planned to be done and what was actually done. That factor is applied to all remaining work in the product backlog 225. For example, if the test work required twice as much time as expected, then the product backlog 225 estimates are all multiplied by two to account for this new information. The trended numbers are submitted to the financial governance portion 270 of the centralized process as the final project estimate. Re-trending and re-estimating may be repeated as many times as needed until it stabilizes.

Figure 9:
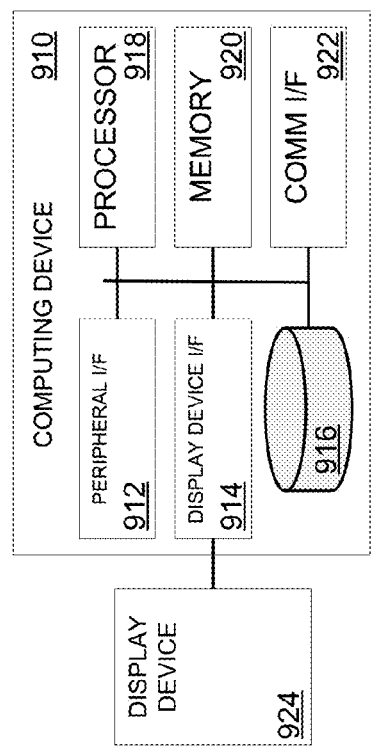
FIG. 9 shows an example computing device that may be used to implement features described above with reference to FIGS. 1-8.

FIG. 9 shows an example computing device 910 that may be used to implement features described above with reference to FIGS. 1-8. The computing device 910 includes a processor 918, memory device 920, communication interface 922, peripheral device interface 912, display device interface 914, and data storage device 916. FIG. 9 also shows a display device 924, which may be coupled to or included within the computing device 910.

The memory device 920 may be or include a device such as a Dynamic Random Access Memory (D-RAM), Static RAM (S-RAM), or other RAM or a flash memory. The data storage device 916 may be or include a hard disk, a magneto-optical medium, an optical medium such as a CD-ROM, a digital versatile disk (DVDs), or Blu-Ray disc (BD), or other type of device for electronic data storage.

The communication interface 922 may be, for example, a communications port, a wired transceiver, a wireless transceiver, and/or a network card. The communication interface 922 may be capable of communicating using technologies such as Ethernet, fiber optics, microwave, xDSL (Digital Subscriber Line), Wireless Local Area Network (WLAN) technology, wireless cellular technology, and/or any other appropriate technology.

The peripheral device interface 912 is configured to communicate with one or more peripheral devices. The peripheral device interface 912 operates using a technology such as Universal Serial Bus (USB), PS/2, Bluetooth, infrared, serial port, parallel port, and/or other appropriate technology. The peripheral device interface 912 may, for example, receive input data from an input device such as a keyboard, a mouse, a trackball, a touch screen, a touch pad, a stylus pad, and/or other device. Alternatively or additionally, the peripheral device interface 912 may communicate output data to a printer that is attached to the computing device 910 via the peripheral device interface 912.

The display device interface 914 may be an interface configured to communicate data to display device 924. The display device 924 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 914 may operate using technology such as Video Graphics Array (VGA), Super VGA (S-VGA), Digital Visual Interface (DVI), High-Definition Multimedia Interface (HDMI), or other appropriate technology. The display device interface 914 may communicate display data from the processor 918 to the display device 924 for display by the display device 924. As shown in FIG. 9, the display device 924 may be external to the computing device 910, and coupled to the computing device 910 via the display device interface 914. Alternatively, the display device 924 may be included in the computing device 900.

An instance of the computing device 910 of FIG. 9 may be configured to perform any feature or any combination of features described above as performed. Alternatively or additionally, the memory device 920 and/or the data storage device 916 may store instructions which, when executed by the processor 918, cause the processor 918 to perform any feature or any combination of features described above as performed. Alternatively or additionally, each or any of the features described above as performed may be performed by the processor 918 in conjunction with the memory device 920, communication interface 922, peripheral device interface 912, display device interface 914, and/or storage device 916.

Figure 10:
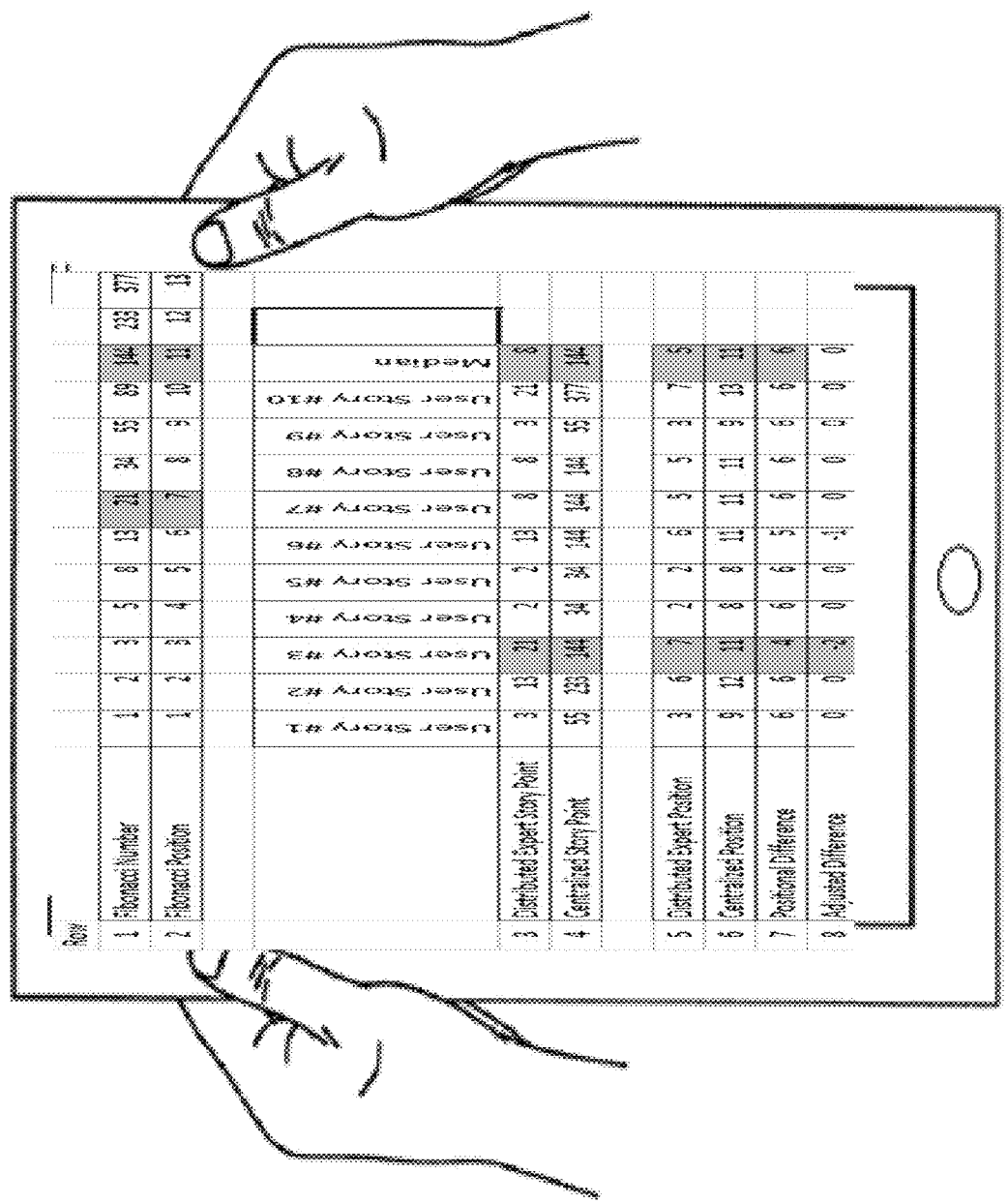
FIG. 10 shows a tablet computer that is a more specific example of the computing device of FIG. 9.

FIG. 10 shows a tablet computer 1010 that is a more specific example of the computing device 910 of FIG. 9. The tablet computer 1010 may include a processor (not depicted), memory device (not depicted), communication interface (not depicted), peripheral device interface (not depicted), display device interface (not depicted), storage device (not depicted), and touch screen display 1024, which may possess characteristics of the processor 918, memory device 920, communication interface 922, peripheral device interface 912, display device interface 914, storage device 916, and display device 924, respectively, as described above with reference to FIG. 9. The touch screen display 1024 may receive user input using technology such as, for example, resistive sensing technology, capacitive sensing technology, optical sensing technology, or any other appropriate touch-sensing technology.

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Although the methods and features are described above with reference to the example system 100 of FIG. 1 for a system and method of distributed estimation with a centralized process, using two approaches that are adapted together, the methods and features described above may be performed, mutatis mutandis, using any appropriate architecture and/or computing environment. Although features and elements are described above in particular combinations, each feature or element can be used alone or in any combination with or without the other features and elements. For example, each feature or element as described above with reference to FIGS. 1-10 may be used alone without the other features and elements or in various combinations with or without other features and elements. Sub-elements of the methods and features described above with reference to FIGS. 1-10 may be performed in any arbitrary order (including concurrently), in any combination or sub-combination.

What is claimed is:

1. A system for monitoring software project development, the system comprising:
   a communication interface that receives, via one or more networks, information included in communications regarding the project development;
   a processor and memory that are integrated to:
   identify from the information a plurality of user stories for completion during development and a plurality of resources associated with each of the plurality of user stories;
   estimate a priority of each of the plurality of user stories;
   assign a value to each of the plurality of user stories, the assigned value representing an amount of effort needed to complete the respective user story;
   provide a threshold based on the resources and development based on the assigned value based on the organizational priorities of the development;
   monitor the burndown of each of the plurality of user stories, estimated priority and assigned value in the memory as ones of the plurality of user stories are completed as compared to the provided threshold;
   calibrate a difference in the assigned value of each of the plurality of user stories using a central calibration within an organization; and
   update a product backlog of user stories with the user story's associated calibrated assigned value and adjust resources associated with each of the plurality of user stories in the product backlog; and
   a display device for displaying the status of the project development based on a plurality of user stories remaining in the product backlog as compared to a plurality of completed user stories.

2. The system of claim 1 wherein the estimated priority of each of the plurality of user stories is updated based on feedback from a plurality of completed story points in the product backlog.

3. The system of claim 1 wherein the value is one of a numerical sequence.

4. The system of claim 1 wherein at least one of the user stories included in the backlog is completed during a sprint.

5. The system of claim 1 wherein one of the plurality of user stories provides a basis for the respective priority associated with each of the other of the plurality of user stories.

6. The system of claim 1 wherein at least one of the plurality of user stories in the product backlog is modified.

7. The system of claim 1 wherein at least one of the priorities associated with the plurality of user stories in the product backlog is modified.

8. A method of monitoring system project development, the method comprising:
   receiving, via a communication interface, via one or more networks, information included in communications about the project between at least one of a product owner, a developer, and a project manager;
   identifying, by a processor, from the information a plurality of user stories and a plurality of resources associated with each of the plurality of user stories for completion during the development;
   assigning, by a processor, each of the plurality of user stories a priority and a value based on an amount of effort required to complete the respective user story and storing the user story, the assigned priority and assigned value in a memory as a product backlog;
   providing a threshold based on the resources and development based on the assigned value based on the organizational priorities of the development;
   monitoring the burndown of each of the plurality of user stories, estimated priority and assigned value as ones of the plurality of user stories are completed as compared to the provided threshold;
   at the processor, accessing the memory to read the product backlog including the assigned priorities and the assigned values, and selecting at least one user story and the assigned priorities and the assigned values from the product backlog for building a sprint based on the assigned priorities and the assigned values;
   calibrating, at the processor, a difference in the value of each of the plurality of user stories using a central calibration within an organization;
   upon completion of any of the user stories included in the backlog, updating, by the processor, the product backlog in the memory and adjusting resources associated with each of the plurality of user stories in the product backlog; and
   at the processor, iterating the selecting and updating based on the information that evidences that user stories are being completed and that additional story points are selected for inclusion in the backlog; and
   displaying, on a display device, the backlog as selected by the processor from the product backlog and the status of the project development based on user stories remaining in the product backlog as compared to the user stories completed from the product backlog.

9. The method of claim 8 wherein the assigned priority of each of the plurality of user stories is updated based on feedback from the completed user stories in the backlog.

10. The method of claim 8 wherein the value is one of a numerical sequence.

11. The method of claim 8 wherein at least one of the user stories included in the backlog is completed during a sprint process.

12. The method of claim 8 wherein one of the plurality of user stories provides a basis for the respective priority associated with each of the other of the plurality of user stories.

13. The method of claim 8 wherein at least one of the plurality of user stories in the product backlog is modified.

14. The method of claim 8 wherein at least one of the priorities associated with the plurality of user stories in the product backlog is modified.

15. A non-transitory computer-readable medium having processor-executable instructions stored thereon which, when executed by at least one processor, will cause the at least one processor to perform a method of monitoring project development using user stories, the method comprising:

receiving, via a communication interface, via one or more networks, information included in communications about the project between at least one of a product owner, a developer, and a project manager;

identifying, by a processor, from the information a plurality of user stories and a plurality of resources associated with each of the plurality of user stories for completion during the development;

assigning, by a processor, each of the plurality of user stories a priority and a value based on an amount of effort required to complete the respective user story and storing the user story, the assigned priority and assigned value in a memory as a product backlog;

providing a threshold based on the resources and development based on the assigned value based on the organization priorities of the development;

monitoring the burndown of each of the plurality of user stories, estimated priority and assigned value as ones of the plurality of user stories are completed as compare to the provided threshold;

at the processor, accessing the memory to read the product backlog including the assigned priorities and the assigned values, and selecting at least one user story and the assigned priority and the assigned value from the product backlog for building a sprint based on the assigned priorities and the assigned values;

calibrating, at the processor, a difference in the value of each of the plurality of user stories using a central calibration within an organization;

upon completion of any of the user stories included in the backlog, updating, by the processor, the product backlog in the memory and adjusting resources associated with each of the plurality of user stories in the product backlog; and at the processor, iterating the selecting and updating based on the information that evidences that user stories are being completed and that additional story points are selected for inclusion in the backlog; and displaying, on a display device, the backlog as selected by the processor from the product backlog and the status of the project development based on user stories remaining in the product backlog as compared to the user stories completed from the product backlog.

16. The computer-readable medium of claim 15 wherein the assigned priority of each of the plurality of user stories is updated based on feedback from the completed user stories in the backlog.

17. The computer-readable medium of claim 15 wherein one of the plurality of user stories provides a basis for the respective priority associated with each of the other of the plurality of user stories.

18. The computer-readable medium of claim 15 wherein at least one of the priorities associated with the plurality of user stories in the product backlog is modified.

* * * * *